(12) United States Patent
Wilson

(10) Patent No.: US 10,415,556 B2
(45) Date of Patent: Sep. 17, 2019

(54) PICKUP TRUCK HYDRAULIC CONCRETE PUMP

(71) Applicant: Neil Wilson, Addison, IL (US)

(72) Inventor: Neil Wilson, Addison, IL (US)

( * ) Notice: Subject to any disclaimer, the term of this patent is extended or adjusted under 35 U.S.C. 154(b) by 168 days.

(21) Appl. No.: 15/599,104

(22) Filed: May 18, 2017

(65) Prior Publication Data
US 2018/0335025 A1     Nov. 22, 2018

(51) Int. Cl.

| | | |
|---|---|---|
| F04B 17/06 | (2006.01) | |
| F04B 15/02 | (2006.01) | |
| F04B 19/22 | (2006.01) | |
| B60K 25/06 | (2006.01) | |
| B60P 3/22 | (2006.01) | |
| E04G 21/04 | (2006.01) | |
| F04B 17/05 | (2006.01) | |
| B60K 17/28 | (2006.01) | |

(52) U.S. Cl.
CPC .............. *F04B 17/06* (2013.01); *B60K 25/06* (2013.01); *B60P 3/225* (2013.01); *E04G 21/04* (2013.01); *F04B 15/02* (2013.01); *F04B 15/023* (2013.01); *F04B 17/05* (2013.01); *F04B 19/22* (2013.01); *B60K 17/28* (2013.01)

(58) Field of Classification Search
CPC ......... F04B 17/06; B60K 25/06; B60K 17/28; A01B 71/06
See application file for complete search history.

(56) References Cited

U.S. PATENT DOCUMENTS

| | | |
|---|---|---|
| 3,279,382 A | 10/1966 | Bennett |
| 3,507,347 A | 4/1970 | Bennett |
| 3,532,442 A | 10/1970 | Van der Plaats |
| 5,687,809 A * | 11/1997 | Braud ...................... B60K 5/04 180/292 |
| 6,015,019 A * | 1/2000 | Grimes .................. B60K 17/28 180/324 |
| 6,726,560 B2 * | 4/2004 | Ho ..................... A01D 41/1274 460/59 |

(Continued)

FOREIGN PATENT DOCUMENTS

CN          205292289 U      6/2016

OTHER PUBLICATIONS

The International Search Report dated Feb. 14, 2018; PCT/US2017/057794.

(Continued)

*Primary Examiner* — Faye M Fleming

(74) *Attorney, Agent, or Firm* — Ladas & Parry LLP

(57) ABSTRACT

Provided herein is a portable pump on a class 3-5 operable pickup truck rolling chassis with engine and transmission components for pumping liquid and/or slurried construction material, such as concrete, comprising a hydraulic pumping unit operably connected to a piston operated unit for charging first and second charging units with said construction material and for pumping said material therefrom where desired, wherein said hydraulic pumping unit is manually and/or remotely controlled by a PTO function of the pickup truck chassis engine, and wherein said pickup chassis includes first and second drive shafts mounted on opposite sides of a gearbox in connection with said PTO function.)

15 Claims, 3 Drawing Sheets

(56) References Cited

U.S. PATENT DOCUMENTS

| | | | |
|---|---|---|---|
| 8,517,139 B2* | 8/2013 | Komatsu | B60K 17/08 |
| | | | 180/233 |
| 8,567,538 B2* | 10/2013 | Hancock, Sr. | B60K 25/00 |
| | | | 180/53.1 |
| 9,637,000 B2* | 5/2017 | Husson | B60K 17/28 |
| 9,868,350 B2* | 1/2018 | Murakawa | B60K 17/28 |
| 2004/0069544 A1* | 4/2004 | Brauer | A01D 90/14 |
| | | | 180/53.4 |
| 2006/0180100 A1 | 8/2006 | Nikolai | |

OTHER PUBLICATIONS

Transcrete products brochure, retrieved from https://www.transcrete.com/products/ dated Apr. 26, 2019.

* cited by examiner

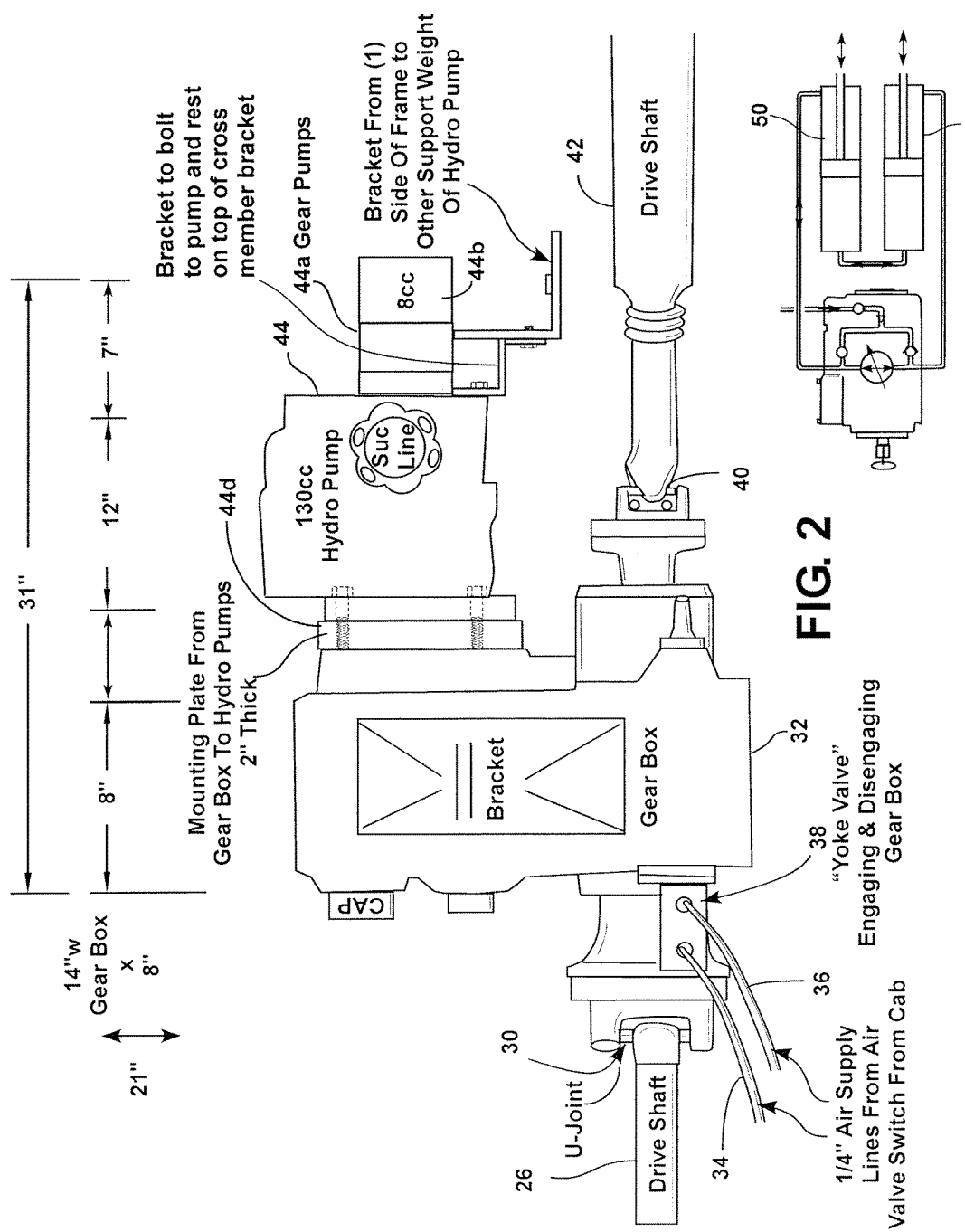

PICKUP TRUCK HYDRAULIC CONCRETE PUMP

FIELD OF THE INVENTION

The invention concerns a mobile concrete pump with a structural frame mounted on the undercarriage of a pickup truck chassis and operable, inter alia, by detachable interconnection with the truck engine, and in which the truck is of a size and class not requiring a commercial driver's license and/or specialized DOT requirements.

BACKGROUND OF THE INVENTION

Moveable concrete pumping units, especially those mounted on large vehicle or truck chassis and many equipped with pump booms, have become ubiquitous in the construction industry for transferring liquid or slurried construction materials, e.g., concrete, to required areas, instead of using the age old bucket approach. Many, if not essentially all, of the modern conventional movable concrete pumping units are mounted on large multi-axis vehicle chassis, such as semi-trailer or tractor trailer structural frames, which require commercial driver license certification, and many of which are only allowed to travel upon public roads to work sites by way of permitting or otherwise special permission. Access to many work sites over certain roads and bridges is oftentimes not permitted. Size requirements to enter a work site, such as an inner city work site, can also become problematic. Compliance with department of transportation regulations setting restriction on vehicle length, height, and weight is also of concern. Many of today's conventional pump rigs are also of a height requiring crews to climb up on to the rig to operate and/or maintain, and which leads to potential accidents and concomitant increased insurance premiums. An example of such a large sized unit is shown in U.S. Pat. No. 7,543,851.

A significant industrial need therefore exists for smaller, highly efficient, high capacity movable concrete pumps which can be mounted on tuck chassis, such as a pickup truck platform, for which a specialized commercial license is not required, and which a special operating permit is also not required. Such a unit should ideally be able to be successfully operated by a crew of one from the ground level requiring no climbing aboard potentially slick metal surfaces which greatly increase safety concerns, and should also be of an operating capacity useable in most or all commercial construction sites, such a multilevel office and residential buildings. The present inventive mobile concrete pump units fulfill such a need which heretofore have been available.

SUMMARY OF THE INVENTION

The present invention provides a mobile hydraulic concrete pump preferably mounted on a class 4 or 5 pickup chassis, and operable by detachable interconnection with a truck engine which propels the pickup truck chassis to construction sites as desired, i.e. transporting the mobile pump.

These and other features of the present invention may be more fully appreciated with reference to the following Detailed Discussion of Preferred Embodiments with reference to the drawings.

BRIEF DESCRIPTION OF THE DRAWING

FIG. 2 is a partial side plan view (port side) of several components of a preferred embodiment of the invention.

FIG. 3 is a top plan schematic view of several components of a hydraulic pump for use in a preferred embodiment of the invention.

DETAILED DESCRIPTION OF PREFERRED EMBODIMENTS

The following Detailed Description of Preferred Embodiments is set forth to exemplify preferred examples only, and is provided solely to assist the reader in gaining a comprehensive understanding of the apparatuses, methods, and/or systems described herein. Accordingly, as contemplated, various changes, modifications, and equivalents of the apparatuses, methods, and/or systems described herein will be suggested to those of ordinary skill in the art. Also, description of well-known functions and constructions may, at times, be omitted for increased clarity and conciseness.

Figure 1:
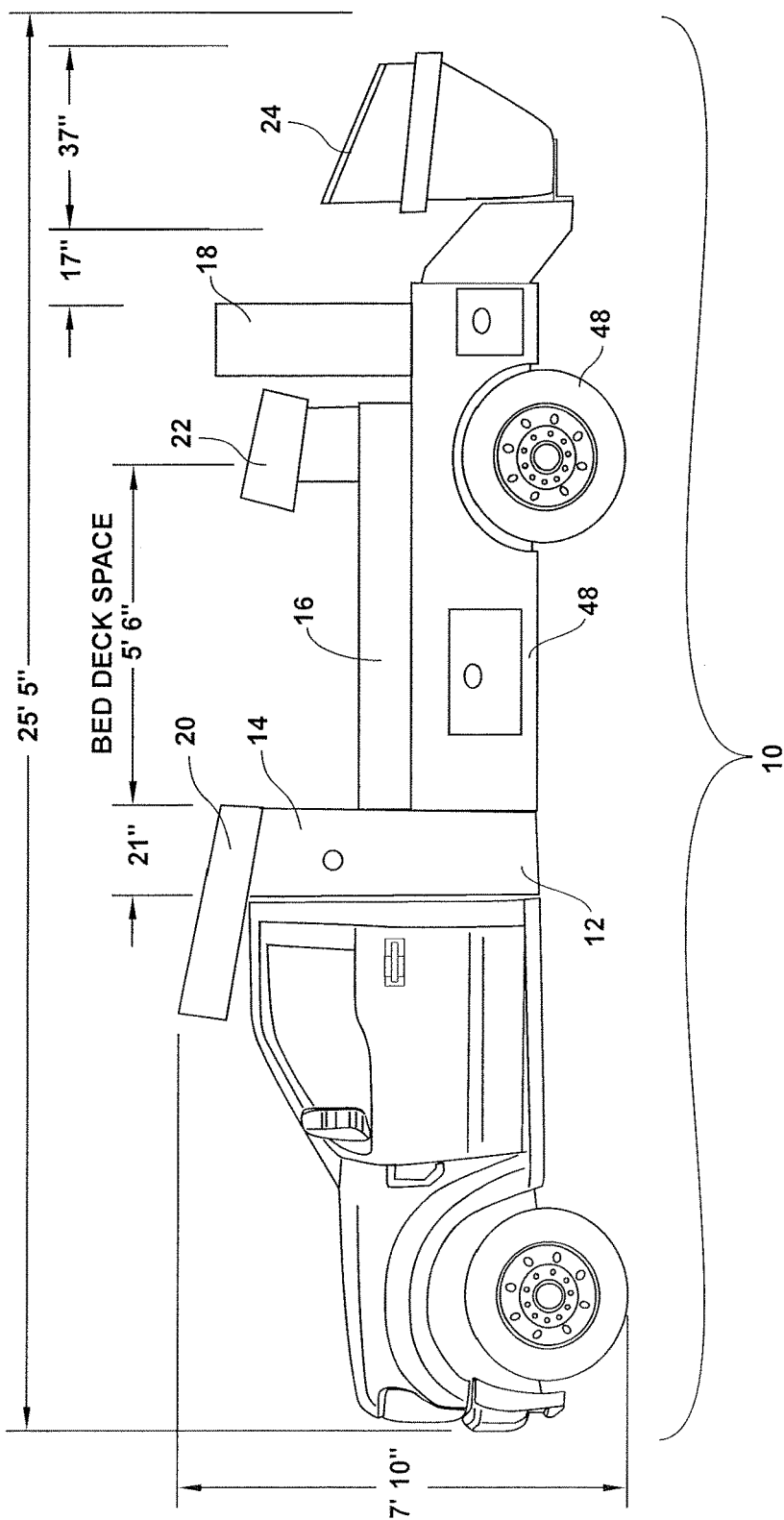
FIG. 1 is a side plan elevational view (port side) of diagrammatic illustration of a modible pump of a preferred embodiment of the invention.

As shown in FIG. 1, there is exemplified is this preferred embodiment a plan side view of a mobile concrete pump with a structural frame mounted on the undercarriage frame of a pickup truck chassis generally shown as 10. The pickup truck chassis is of a size, including weight, length, and height dimensions such that a commercial operator's license is not required to drive the truck mounted pump apparatus to contemplated sites of operation, nor are any special federal, state, and local permitting and/or permitting for DOT requirements in need of compliance.

Some non-limiting examples of preferred pickup truck chassis useable herein for conversion to the pumping units of this invention include, for instance, the Ford F-450® Super Duty Model pickup truck and preferably with dual rear wheels, although such may not be always necessary depending upon tire models employed. A diesel engine is preferred for job site extended run times while pumping construction materials. Other examples of preferred pickup truck models chassis for conversion include the Dodge Ram 4500® HD pickup truck, again preferably equipped with dual rear wheels and a diesel power plant. In other words, ideally any class 4 diesel consumer pickup truck is preferred for use herein as based upon the gross vehicle weight rating (GVWR) for conversion to the pumping units of the invention or trucks classified by the DOT's Federal Highway Administration (FHWA) which groups classes 1-3 as light duty, 4-6 as medium duty, and 7-8 as heavy duty. It is also noted that the United States Environmental Protection Agency has a separate system of emissions classifications for trucks. For general background information the United States Census Bureau in the past has also assigned truck classifications in its now discontinued Vehicle Inventory and Use Survey (VIUS) (formerly Truck Inventory and Use Survey, or TIUS).

Also contemplated for use herein is any cab over design not exceeding any weight, height, and/or length proportions or specifications of any kind requiring specialized licensing operation and/or operation permitting.

Generally, Class 4 consumer trucks preferred for use herein are from about 14,000 to about 16,000 lbs., and include currently available models as mentioned above, such as the Dodge Ram 4500® model pickup truck, Ford F-450® model pickup truck, and also, for example, GMC 4500® model pickup truck and Ford E-450® model pickup truck, and equivalent foreign versions as designated under Foreign classifications, such as Canada and the European Union Class C1 GVWR limit of 7,500 kg, or somewhat in excess of 16,000 lbs. Also contemplated depending upon certain applications and capacity are class 3 consumer trucks of GVWR of from about 10,000 to about 14,000 lbs., of which the Dodge Ram 3500® model pickup truck, GMC Sierra 3500® model pickup truck, Ford F-350® model pickup truck, Ford E-350® model pickup truck, and Hummer H1® model pickup truck are non-limiting examples. In yet still additional examples, in some contemplated applications class 5 consumer trucks of GVWR of from about 16,000 to about 19,500 lbs. may be suitable, examples of which include the Dodge Ram 5500® model pickup truck, GMC 5500® model pickup truck, Ford F-550® model pickup truck, and International Terra Star.

As a further example, a typical class 4 F-450® pickup truck consumer truck preferably suitable for use herein will have the following specifications:

Ford F450®
Vehicle: F-450® DRW 4×4 Crew Cab
Engine: 6.7 L Power Stroke® V-8 Turbo diesel
Power: 440 hp at 2,800 rpm
Torque: 860 lb-ft at 1,600 rpm
Transmission: TorqShift six-speed Automatic®
Drive Type: Four-wheel drive
Frame Material: Mild- and high-strength steel
Frame Design: C-channel ladder frame with boxed sections
Frame Manufacturing Method: Stamped components joined with welds and rivets
Framerail Thickness: 0.26 inch (6.6 mm)
Number of Crossmembers: 8
Crossmember Thickness: 0.12 to 0.23 inches (3.0 to 5.74 mm)
Gooseneck/Fifth-Wheel Crossmember Thickness: 0.25 inches (6.35 mm)
Front Suspension: Solid live axle with trailing arms, coil springs, Tenneco shock absorbers, and stabilizer bar
Rear Suspension: Solid live axle with four leaf springs, Tenneco shock absorbers, and stabilizer bar
Front Axle: Dana Super 60
Axleshaft Material: 1040 Steel
Axleshaft Diameter: 1.35 inches (34.4 mm)
Differential Type: Open
Ring Gear Size: 10.07 inches (256 mm)
Oil Capacity: 2.9 quarts (2.8 L)
Track Width: 74.8 inches
Rear Axle: Dana S110
Axleshaft Material: 1040 Steel
Axleshaft Diameter: 1.61 inches (40.9 mm)
Differential Type: Helical open
Ring Gear Size: 12.17 inches (309 mm)
Oil Capacity: 7 quarts
Track Width: 75.9 inches
Axle Ratios: 3.73:1
Driveshaft Material: Steel
Driveshaft Outside Diameter: 3.5 inches Specifications of the F-450® pickup truck 6.7 L Power Stroke® turbo diesel for preferred use herein include the following:

Configuration: OHV (32-valve)
Fuel Injection: High-Pressure Common-Rail
Engine Control System: Electronic
Induction System: Single-Sequential Turbocharger; charged air cooler
Battery: Dual 12-volt; 750-cca/78-amp-hr
Alternator: 157-amp standard on XL, XLT
    220-amp standard on Lariat, King Ranch, Platinum (optional on XL, XLT)
    Dual combined 322-amp, optional
    Dual combined 377-amp, optional
Oil-Lite Monitor: Intelligent Oil-Light Monitor®
Cylinders: 8
Cylinder Head: Aluminum
Block Material: Compacted graphite iron
Valve Operation: Push rod/rocker arms
Camshaft Drive: Gear
Bore: 3.90"
Stroke: 4.25"
Compression Ratio: 16.2:1
Horsepower/rpm: 440 @ 2,800
Torque lb-ft/rpm: 925@1,800
    (1) Certified to SAE J1349

Exemplified preferred transmission specifications include the following:

Transmission Type: TorqueShift 6-Speed SelectShift Automatic® (F-250 Diesel, F-350/F-450)
Case Material: Aluminum
Power Takeoff: Live-drive access on driver side The truck conversion unit (i.e. pickup truck) serving as the basis of the powered structural frame pickup truck chassis in accordance with the invention can easily be obtained from any conventional dealership, and where such can be easily serviced or by any other vehicle servicing entity. A preferred example of a conversion in accordance with the invention as mentioned is shown in FIG. 1, with some preferred dimensions, and preferred component set ups discussed more in detail below. As generally shown in FIG. 1 there is a plan side schematic view of the port side a typically converted Ford F-450® pickup truck diesel engine controlled split shaft power take-off ("PTO") hydraulic concrete pump mobile unit which can be operated with an ordinary driver's license and needs no special permitting of any kind to travel over any type of roads to a contemplated job site, be it a multilevel building, foundation, or a backyard pool, etc. In this preferred example in FIG. 1, the F-450® pickup truck is modified by stripping all non-essential components extending from the back of the cab compartment leaving the transmission housing, and rolling chassis with wheels and outer frame rails shown generally as 48. To the extent possible all modified components installed including mounting brackets, reservoir components, such as hydraulic fluid and water reservoir compartments, pipe and hose containment compartments and the like, except, for example, hydraulic pump cylinders and the like, are of aluminum or composite construction to reduce weight. Thus, as shown in FIG. 1 there is shown generally a mobile concrete pump apparatus mounted on the undercarriage bed frame of an F-450® pickup truck chassis 10, fitted with a hydraulic fluids tank (not shown in this FIG.), water tank 14, a substantially horizontally, longitudinally mounted (relative to truck chassis 10), or flush-deck mounted, hydraulic pumping unit system shown generally as 16 (explained in greater detail below) above drive shaft apparatus (drive shafts and differentials discussed below) and real axel gear hub (not shown in this FIG.), with electronic control unit 18. Storage units or containment compartments for extendable pipes/hoses for concrete and/or construction material placement are indicated as 20 and 22. A hopper unit 24 for feeding wet concrete mix and/or other construction materials to be pumped through hydraulic pumping unit 16 and placed where desired at a construction site is mounted at the tail end and depicted as 24. In this particular preferred embodiment the F-450® pickup truck modified to mobile concrete pumping apparatus in accordance with the invention is approximately 25'5" long from front truck bumper to hopper 24 end, with a bed deck space of approximately 5'6." This F-450® pickup truck base model has a wheelbase of 169" and employs dual back wheels. The suspension employs a 2½" steel lift kit, while otherwise remaining stock. A split dual driveshaft set up with a distribution gearbox transfer case assembly operably situated therebetween is exemplified in this preferred example, preferably employing a gearbox comprising a yolk valve such as a Stibel G61 distribution gearbox, which is installed as operably coupled to the dual driveshafts as further explained below. A model G61 gearbox is but one brand of a type of gearbox preferred for use herein, with any equivalent option/brand also contemplated. This preferred example mobile hydraulic pump system is unique in employing two drive shafts in operable connection with a distribution gearbox. This preferred example is of approximately 16,000 lbs. total weight, with weights of up to 19,000 lbs GVWR contemplated.

As shown in FIG. 2, the rolling chassis generally shown as 48 complete with dual rear wheels is fitted with a first drive shaft 26 with universal joint 30 connected to distribution gearbox/transfer case, shown generally as 32, preferably a Stibel G61 model, which is supplied with airlines operably connected to a compressed air unit (not shown), with air lines shown as 34 and 36 (shown preferably as ¼") and operated by an air valve switch (such as situated in the vehicle cab and not shown) to control a yoke valve 38 which engages and disengages the gearbox 32 with drive shaft 26 on demand, or in other words performs a PTO driven function. When not engaged (or disengaged), the gearbox 32 is coupled by way of a second universal joint 40 to a second drive shaft 42 which drivably operates the F450® pickup truck vehicle rolling chassis 48 for movement of the pumping system to a work site. It is also contemplated that yoke valve 38 be operable by an elective switch.

When in an engaged mode with gearbox 32, driveshaft 26 by way of the F-450® pickup truck engine will operate a hydraulic pumping unit (concrete and/or other construction materials), shown generally as 44, here of preferred 130 cc capacity, but may also be of any contemplated capacity for pumping up to approximately 120 yards per hour.

With reference to the PTO driven gearbox, as is known, operates a hydraulic pump in connection with hydraulic fluid lines connected to a hydraulic fluids reservoir which operates hydraulic pistons in cylinders in the hydraulic pump. The hydraulic pump is preferably electrically controlled as explained below.

Hydraulic pump 44 in turn is in operable connection with secondary gear pump 44a of preferred capacity of 11 cc, and which can be of a larger or smaller capacity depending upon, for example, operational conditions as contemplated, including contemplated pumping capacity. Secondary pump 44a is employed in this preferred example for building accumulator pressure of approximately 1,000 PSI in an accumulator tank (not shown). Pressure in the accumulator tank is employed for operational cycling of an S-tube by way of one or more throw cylinders (not shown) which operationally shift the S-tube as connected to hopper 24, as more fully discussed below. In operational connection to secondary pump 44a is tertiary pump 44b, shown herein of a preferred capacity of 8 cc, and which also can be on a larger or smaller capacity depending again, for example, upon operational conditions contemplated, including contemplated pumping capacity. Pump 44b is employed in this preferred example for operational control of a remixer (not shown) situated in hopper 24, for remixing concrete and for force-feeding sometimes harsh or bulky concrete or other construction material mixes into material feed tubes/cylinders 54a and 54b from hopper 24, again described in more detail below. Pump 44b in this preferred example is also employed for providing hydraulic pressure for a water pump function (water pump not shown). A suction line port 44c for hydraulic fluid is illustrated as situated on the side of hydraulic pump 44, with partial view of mounting bracket 44d which is operably engaged with gearbox 32, for example, by way of a mounting plate shown generally as 46. The hydraulic pump 44 is generally preferred to be of a pressure capacity of approximately 5,000 PSI, and most preferably approximately 4,000 PSI for most applications contemplated herein.

Here, a discussion of suitable and preferred pumping units is in order. Preferred for use in this invention are concrete pumping units of the hydraulic twin cylinder type for conveying liquid and/or slurried concrete and/or other liquid/slurried construction materials. Twin cylinder concrete pumps have been known since the 1950's and first introduced by Schwing GmbH, and has been adopted by most modern or conventional concrete pumping units.

Figure 4:
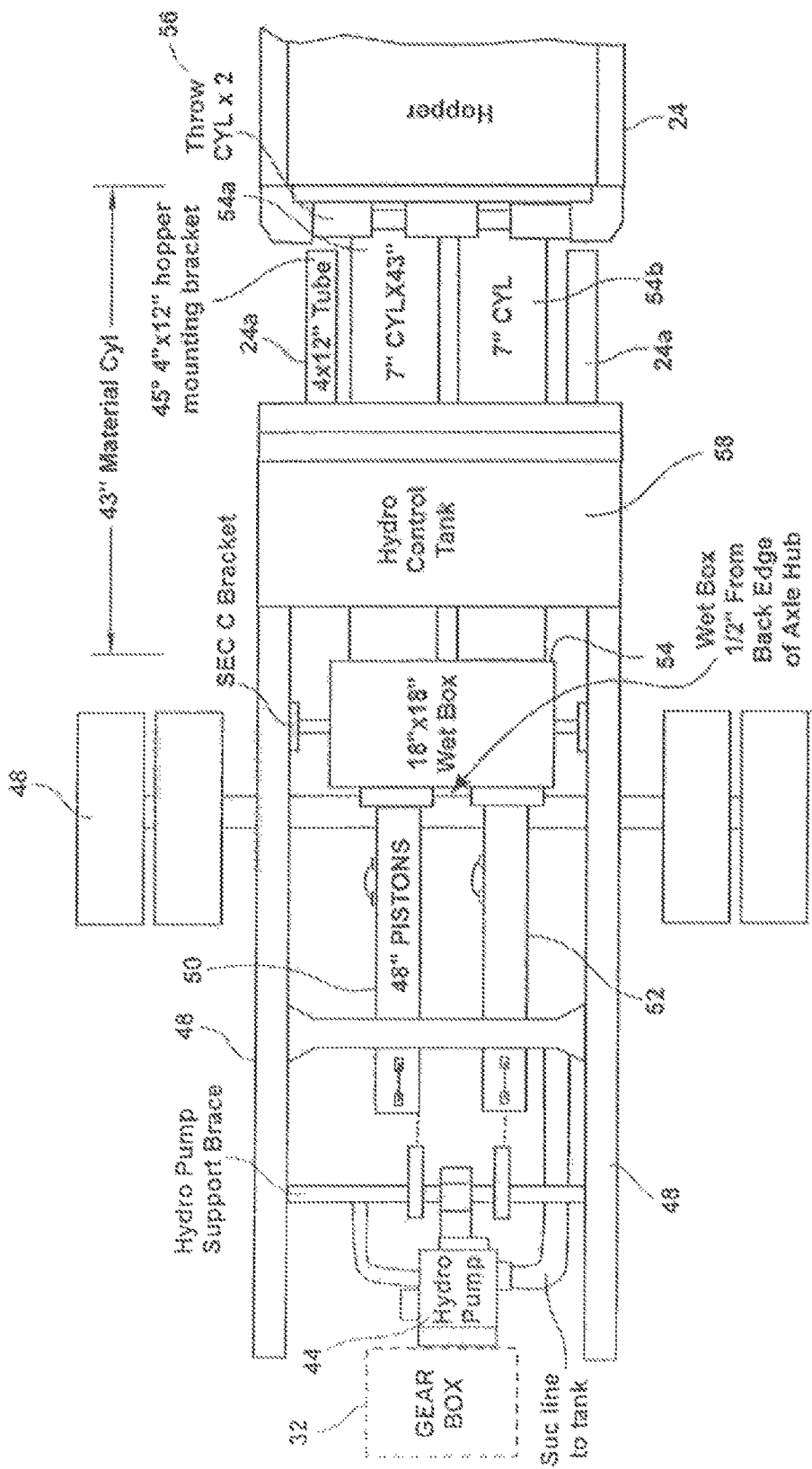
FIG. 4 is a top plan schematic view of several components of preferred embodiments of the invention, including hydraulic pump components and material feed to the pump.

As shown in partial schematic view in FIGS. 3-4, such hydraulic pumps typically work by way of parallel piston cylinders with one piston cylinder drawing liquid or slurried construction material, e.g. concrete mix, into a material cylinder from a hopper while the other, usually parallel, cylinder simultaneously pushes its concrete load by way of the parallel piston cylinder out into one or more discharge pipes. There is usually situated a valve which determines which material cylinder is open to the concrete hopper to receive construction material to be pumped and which one is open to the discharge pipes to place pumped construction material where desired, and which switches over each time the pistons in the respective cylinders reach their end points, with the process continuing with the first cylinder now discharging and the second drawing fresh construction material, e.g. concrete, from the hopper. Such pumps have largely displaced cranes employed to lift large buckets (skips) of concrete and other construction materials to where needed and normally limited to only approximately two cubic yards of concrete. The hydraulic pumps employed herein understandably pump concrete much faster than the old bucket/skip in placing a much larger volume of concrete per hour, and usually can pump as fast as a truck mixer can discharge material in to a hopper. Such hydraulic concrete pumps preferred for use herein generally have a capacity of approximately 50 to in excess of 100 cubic yards per hour, such as 120 cubic yards per hour, and most preferably from approximately 60 to 70 cubic yards per hour. In any event, twin cylinder hydraulic concrete pumping apparatuses such as preferred in the present invention are well known in the art, as to operation and capacity, and need not be discussed in more detail herein except in general operation, and the unique placement and operating configuration and capacity thereof in the pickup truck chassis of the invention.

In another preferred aspect of the present invention, the hopper 24 geometry and size of suction openings are designed to ensure maximum pump output with a desired degree of efficiency. In still yet another preferred embodiment of the invention, an S-pipe changeover cylinder between the twin cylinders is employed to facilitate double end-of-stroke dampening and to also help facilitate a smooth and quiet operation. In yet an additionally preferred embodiment of the invention, a specialized bracket is employed to attach the hopper 24 to the rolling chassis 48 at the rear end of the assembly, shown as hopper brackets 24a, to insure such desired features of height and weight distribution are achieved such that the pumping unit may be operated without any need to mount the pumping unit, and that such may be operated by one person from ground level at all times.

As is further evident from the disclosure herein the operation of the concrete pump preferred for use herein encompasses the use of both hydraulic and electrical systems, for which a preferred system and layout for use in this invention is discussed in more detail below with reference to the drawings.

As shown in the preferred embodiment a pumping unit system containing a gearbox 32 generally designated in FIGS. 1-4 as 16 is situated horizontally, longitudinally within and relative to truck bed frame components 48 above the first drive shaft 26, second driveshaft 42 and truck rear axle gearbox housing 60 employing a system of custom designed mounting brackets suitable for the various purposes of mounting components of the invention in this preferred example. The pump system 16 is horizontally, longitudinally mounted within the truck bed frame units 48 to achieve a compact, low center of gravity "flush deck" design to minimize height requirements, and operability and maintenance requirements, all adding to the unique design operability of the invention.

Again, with reference to FIGS. 1-4, pumping system 19 is of the twin cylinder hydraulic design comprising a pair of pumping cylinders 50 and 52 preferably arranged longitudinally and horizontally within truck frame 48 above drive shafts 26 and 42 and in front of chassis rear axle to counter rear equipment weight, e.g. hopper 24, with gearbox 32 in detachable operable connection with drive shaft 26 and shaft 42.

Also shown in FIG. 4 is wet box 54 in operable connection with material feed tubes/cylinders 54a and 54b providing construction material from hopper 24 to be pumped, and containing water or some other coolant which ensures pistons inside pumping cylinders 50 and 52 are kept lubricated and cooled sufficiently behind included piston pumping cups (not shown). The wet box 54 is situated within frame 48 using suitable mounting brackets, and is preferably mounted to the rear of the truck rolling chassis frame 48 rear axle hub on a suitable bracket for advantageous weight distribution, profile and compactness advantages. The hopper unit 24 is also shown attached to rolling chassis truck frame components shown generally 48 by as next to a hydraulic fluids control tank 58.

A yet more detailed discussion of the hydraulic pumping and hopper feed system is now provided with reference to FIGS. 1-4. This preferred pumping system employs a S-tube design valve system (hereafter "S-tube") or swing cylinder system (not shown) controlled by throw cylinders 56 that move the S-tube as required, as more fully discussed below. Such systems are known and only a general explanation need be provided. This system incorporates material feed cylinders 54a and 54b linked to hydraulic cylinders 50 and 52 that cycle alternately. With concrete material in the hopper 24 and the pump operating, a material cylinder retracts, drawing material into a material cylinder. At full retraction of the cylinder, a signal is sent to both the S-tube swing cylinder and drive cylinder directional valves (not shown) causing the S-tube to shift position to the fully loaded material cylinder and the drive cylinders to change direction. The piston of the loaded pump cylinder then pushes the material through the S-tube and into delivery lines. The shifting from one cylinder to the other cylinder takes place providing a continuous flow of material through the delivery piping system. The pump can be operated at a control panel, e.g. electronic control unit 18, or can be operated from a remote control unit.

Hydraulic oil flow created by a hydraulic pump pushes the drive cylinder pistons inside the drive cylinders 50 and 52 alternately back and forth. Because the drive cylinders and pistons inside the cylinders 50 and 52 are linked together, the pistons move synchronously. When a drive cylinder retracts along with the piston, concrete will be sucked from the hopper 24 into a drive cylinder by way of hydraulic cylinders. Simultaneously, the other drive cylinder and piston are extended toward the hopper. The piston will push material, e.g. concrete, from the cylinders through the S-tube and out to the delivery system. Next, the pump switches at the end of the stroke, causing the S-tube valve to shift to the other cylinder which has sucked and filled the cylinder with concrete, starting the next cycle.

Reverse pumping links the concrete piston in the suction stroke and S-tube valve to suck concrete from the S-tube instead of the hopper. As a result, the concrete piston pumps concrete into the hopper to enable to wash delivery cylinders and other components for future use without hardening of construction materials therein.

As discussed above, the power for operation of the concrete pump is a PTO drive provided by the engine, which drives the hydraulic pumps. All functions for operation of the concrete pump can be accomplished from the local controls mounted on a side or portion of the unit without the need for mounting the unit and which greatly contributes to ease of operation, maintenance, and safety factors. Optional hand-held cable or radio remotes such as RF, or Bluetooth devices, enable the pump to be operated away from a remote distance.

The hydraulic system of the concrete pump in accordance with this preferred embodiment consists of at least three separate circuits and although integrated, each is designed to perform a particular function within the operation of the concrete pump. It will be appreciated that in a preferred example the main hydraulic pump is electronically monitored and controlled as desired, such as in a contemplated operation. The three circuits utilized are:
1) main pump circuit controls operation of the hydraulic drive cylinder valves;
2) S-tube shift circuit controls operation of shifting the s-tube from one material cylinder to the other by way of electronically controlled throw cylinder; and
3) auxiliary circuit controls the operation of an agitator and other auxiliary equipment.

For the purpose of making the operation of each circuit easier to understand, such are described separately below.

The main pump circuit is preferably equipped with a manifold that is drilled and ported to accommodate a relief valve, check valve, flow control and the pilot operated directional valve. A cycle valve may be provided which is a directional spool valve with electro hydraulic solenoid operation, to direct the flow of oil from the main hydraulic pump to one or the other hydraulic drive cylinders. To energize the pump circuit, an adjustable throttle control to set the engine speed at maximum desired RPM may be employed. An open volume control may also be provided to control to any range from 0 to FULL, to alert a load sense to the demand and place the pump on stroke, and wherein the pump will produce a flow in proportion to the amount by which the volume control has been opened. With the PUMP switch in an OFF position, the flow from the hydraulic pump is fed to the main directional valve, thru the valve, and then returns to the hydraulic tank.

To energize the cycling circuit, the PUMP switch is in ON mode. When this is done, an electrical signal is generated which in turn energizes the coils of the main directional pilot valve and also activates the S-tube directional valve.

The material pumping action is the result of the two material cylinders cycling on an alternate basis. This alternating cycling is controlled by an electrical signal that is generated by the proximity sensors located in a flush box at the end of each material cylinder's suction or retraction stroke.

As the piston coupler passes under the proximity sensor, it generates an electrical input signal that is sent to the logic controller, designed to control the alternating action of the material cylinders and to synchronize the movement of the s-tube. The output signal from the logic controller is used to energize the coils of the main directional pilot valve as well as that of the S-tube directional valve.

Example: Mobile Pump Truck Conversion

A preferred mobile pump pickup truck conversion is now exemplified. The starting point for this conversion is a duel wheel Ford F-450® medium duty class 4 diesel powered pickup truck with specifications described hereinabove, having wheelbase of approximately 169." Although a dual wheel is preferred, a single configuration may be employed depending upon tire style and construction. The suspension is equipped with a 2½" steel lift kit, and otherwise remains stock. The lift kit is purely optional and may be omitted, or a different clearance may be desired. As shown above, a split drive gearbox setup is employed, preferably using a Stibel G61 gearbox, although any other equivalent design from any other brand manufacturers may also be suitable. As also noted above dual driveshafts are employed, with a first driveshaft with first universal joint and second driveshaft with second universal joint operating from the opposite sides of the gearbox. An auxiliary air tank for compressed air supply is fitted to the truck chassis where convenient to supply upon demand compressed air to engage/disengage an air powered yolk valve on the gearbox, which will disengage the engine driveshaft from the drive train and engage such with the gearbox to run the hydraulic pump system, functioning as a PTO driven pump system.

Airlines employed in this example are 150 psi poly tubing ¼"DIA, which may travel through the cab floor into the control dashboard where a PTO air switch is controlled. RPMs of the truck engine can be manually controlled to control RPMs preferably of approximately 2000 rpm's down to approximately 1700 RPMs or otherwise within a desired range, such as an equipment manufacture's specifications recommendations for a correct or desired RPM setting for an efficient flow of fluid for hydraulic pumps and gear pumps. An electronically controlled switch may also be employed. Detachable gearbox brackets with removable bolts are equipped with rubber bushings in between mounting plates to take up vibration in distortion. A driveshaft mounting flange operably engages to the Stibel gearbox flange. A crossmember hydraulic support bracket for the hydraulic pumps also acts as a crossmember replacement for an original crossmember that was removed. Axle suspension rubber stops are to stop an axle from overextension into main pistons. A first set of brackets for mounting the pumping unit to the frame at the point of wet box is provided. A second mounting set of brackets for the rear of the concrete pump is also provided. A 12"×3"×34" half inch thick steel plate is installed across entire frame. Attached to this plate and protruding down on a 45° angle, is 13"×4" wide tube stock, or hopper brackets 24a shown in FIG. 4, with angle iron plate at the very bottom of the 45° angle where the pump hopper is welded or bolted to support the weight of the hopper and pumping cell package. In this preferred example it is important that the pumping cell package is installed in this position for desired operational/functioning standards. Pistons bolted to the wet box are situated right at the axle hub. This preferred set up provides for a uniquely balanced truck not previously available. Next, the gearbox may be installed at its set point. The crossmember to support the main hydraulic pump and the two gear pump's which are attached to the main pump may be bolted to the cross support member. The installation of the hydraulic control panel/hydraulic tank may be installed at a back point of the frame of the truck. The brackets for the cooling system fan for the hydraulics may be installed. Such are all the steel parts attached to the truck.

The next phase of the truck conversion is installations of aluminum and/or fiber composite components. A starting point may be with the rear bin assembly behind the truck cab. This is usually a four part process to make for a one piece unit. On the driver side of the truck in this example is the diesel filling port and below that is an approximately 70 to 80 gallon water tank with a water fill port, a breather valve port and a water outlet port control valve. Internal baffles are internally currently installed. To this middle section of tank is installed a diesel tank of approximately 40 to 50 gallon capacity. Crossmembers are installed for structural support that make up the entire structural integrity of this bin assembly. On the passenger side of the truck is installed an air blowout system for blowing out the concrete pumping from the line system that would entail different fittings for different size pumping hose systems. With this a gas engine is employed and also a air pump in line with pulley belts to work along with one another. The air is also used to pressurize the auxiliary air tank under the truck cab. In this bin also are valves that control pressurizing either the auxiliary air tank or switch over the valves simultaneously to then blow out the concrete pumping system with a clean out sponge. There is also installed a adjustable pressure relief valve and a pressure gauge to monitor pressure. On top of the bin set up is installed a pipe rack which is bolted on so to be removed at a later time to allow for engine work on the truck. The removal of this rack will allow the cab to be raised completely off the chassis cab for engine maintenance. Moving to the bed of the truck, the deck has a removable center access hatch panel to allow for easy access for maintenance on the main hydraulic pumps, replacing hydraulic hoses, working on and access to the gearbox, etc. At the back portion of the truck body are the rear pipe rack supports that hold the downward side of a steel pipe system used for material delivery. Preferably in this example the pipe racks will hold eight 4×10' steel pipes per side for a total of 16 pipes.

This truck is designed such that access to any component is accomplished without the need to mount the truck at any time. The truck is also designed for the weight to be evenly dispersed to balance out the weights of the truck, fuel, water, pipes, and other components all sitting aft of rear axle. The bed of the truck is designed to hold approximately 300 feet of 2½ inch hoses. This truck is also designed for the top pipes for 150 feet of 3"×25' hose to be draped over the top of pipes to rear of the truck. This truck is also equipped with a hydraulically driven water pump which draws water from the 80 gallon water tank. On the driver side is situated a utility storage box for carrying extra tools and parts. This example truck also has a drop down side to allow for loading in unloading of hoses on the bed to be easily removed and re-installed. A aluminum pass-through sight through has been created through the top of the hydraulic control box to allow site in the rearview mirror of the truck to see through to the back of the truck and rear traffic. The visibility from the mirrors on passenger and driver side of truck are designed to see easily about the back of the truck providing great visibility. The visibility through the rear window of the cab has been enlarged to create for enhanced visibility through to the back of the truck. This truck is designed with safety and flexibility to move about job sites with a turning radius that is very tight and which exceeds any other mobile pumping unit.

The pump that is used in this example is preferably a Putzmeister TK 70 twin cylinder hydraulic concrete pump, but smaller or larger capacity hydraulic pumps depending on contemplated capacity and end uses are also contemplated for use herein, such as mentioned hereinabove, which generally have a capacity of approximately 50 to in excess of 100 cubic yards per hour, such as 120 cubic yards per hour, and most preferably from approximately 60 to 70 cubic yards per hour. Such pumping units suitable for use herein are available from a wide variety of manufactures, with Putzmeister being just one preferred example. Usually the pumping unit is equipped with an electronically controlled circuit board and digital screen. In this preferred example it is also equipped with a non-stock custom auxiliary cooling hydraulic system, and auxiliary switches which control one/or more cooling fans.

It is important to note, and will be appreciated by those skilled in the art of these types of construction material pumps, that this conventional Putzmeister hydraulic concrete pump and others of its kind are not designed for use on the small compact size chassis of the invention and not recommended for the use herein, which is yet another unique and novel advantage of the invention. Total weight of this truck fully loaded is approximately 16,000 LBS.

As mentioned, the pump is also able to be run by a remote control operation or a hardwire cord switch. RPMs to the truck they may also be manually controlled by cable knob. Auxiliary switches control power to rear panel and to cooling fan.

It will be understood that the above description of the present invention is inclusive of preferred embodiments, and is susceptible to many other various modifications, changes and adaptations, and the same are intended to be comprehended within the meaning and range of equivalents of the appended claims.

I claim:

1. A portable pump on a class 3-4 operable pickup truck rolling chassis with engine and transmission components for pumping liquid and/or slurried construction material comprising a hydraulic pumping unit operably connected to a piston operated unit for charging first and second charging units with said construction material and for pumping said material therefrom where desired, wherein said hydraulic pumping unit is manually and/or remotely controlled by a PTO function of the pickup truck chassis engine, and wherein said pickup chassis includes first and second drive shafts mounted on opposite sides of a gearbox in connection with said PTO function.

2. The portable pump of claim 1 which is diesel powered and in which the operable pickup truck weight totally loaded is approximately 1600 lbs.

3. The portable pump of claim 1 in which said rolling chassis is of dual rear wheel construction.

4. The portable pump of claim 1 in which swing cylinder system controlled by throw cylinders is included for operation of first and second charging units.

5. The portable pump of claim 1 in which said hydraulic pump has a capacity of approximately 50 to 120 cubic yards per hour.

6. The portable pump of claim 1 in which said hydraulic pump has a capacity of approximately 60 to 70 cubic yards per hour.

7. The portable pump of claim 1 which is operable for pumping concrete construction material, and in which the hydraulic pumping unit is of a capacity of approximately 5,000 PSI.

8. The portable pump of claim 7 in which the hydraulic pumping unit is of a capacity of from approximately 3,500 to approximately 3,900 PSI.

9. A method for the production of a portable liquid concrete pump comprising, mounting on a class 3-4 operable pickup truck rolling chassis with diesel engine and transmission components a liquid concrete hydraulic pumping unit of approximately up to 5000 PSI pressure capacity which is operably connected to a piston operated unit for charging first and second charging units with liquid concrete and for pumping said liquid concrete where desired, wherein said hydraulic pumping unit is manually and/or remotely controlled by a PTO function of the pickup truck chassis engine, and wherein said method further comprises mounting on said pickup truck chassis first and second drive shafts mounted on opposite sides of gearbox in connection with said PTO function.

10. The method claim 9 wherein said hydraulic pumping unit is of a pressure capacity of approximately 4,000 PSI.

11. The method of claim 9 wherein said portable liquid concrete pump may be operated by one person at all times from ground level, and driven with a consumer vehicle operating license.

12. A method of transporting and pumping liquid concrete with the use of portable pump of claim 1.

13. A method of transporting and pumping liquid concrete with the produced portable liquid concrete pump of claim 9.

14. The method of claim 1 wherein the operable pickup truck weight totally loaded is approximately 1600 lbs.

15. A method of transporting and pumping liquid concrete with the produced portable liquid concrete pump of claim 14.

* * * * *